United States Patent
Ernat et al.

(10) Patent No.: US 10,648,609 B2
(45) Date of Patent: May 12, 2020

(54) STRUCTURAL INSULATING COMPONENT FOR A MULTI-LAYER INSULATION SYSTEM OF A VACUUM INSULATED STRUCTURE

(71) Applicant: WHIRLPOOL CORPORATION, Benton Harbor, MI (US)

(72) Inventors: Nicole M. Ernat, St. Joseph, MI (US); Ashish Nigam, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/308,538

(22) PCT Filed: Apr. 28, 2017

(86) PCT No.: PCT/US2017/030094
§ 371 (c)(1),
(2) Date: Dec. 10, 2018

(87) PCT Pub. No.: WO2018/199980
PCT Pub. Date: Nov. 1, 2018

(65) Prior Publication Data
US 2019/0162355 A1    May 30, 2019

(51) Int. Cl.
*F16L 59/04*    (2006.01)
*F16L 59/065*   (2006.01)
*F25D 23/06*    (2006.01)

(52) U.S. Cl.
CPC .......... *F16L 59/04* (2013.01); *F16L 59/065* (2013.01); *F25D 23/06* (2013.01); *F25D 23/065* (2013.01); *F25D 2201/14* (2013.01)

(58) Field of Classification Search
CPC .......... F16L 59/04; F16L 59/065; F25D 23/06; F25D 23/065; F25D 2201/14
See application file for complete search history.

(56) References Cited

U.S. PATENT DOCUMENTS

| | | | |
|---|---|---|---|
| 4,303,732 A | | 12/1981 | Torobin |
| 5,009,952 A | * | 4/1991 | Klepsch ............... B29C 44/065 428/319.1 |
| 5,118,174 A | * | 6/1992 | Benford .................. B32B 5/20 312/406 |
| 5,171,346 A | * | 12/1992 | Hallett ................... B29C 33/36 264/311 |

(Continued)

FOREIGN PATENT DOCUMENTS

| | | |
|---|---|---|
| RU | 2166158 | 4/2001 |
| WO | WO2016/013746 | * 1/2016 |

*Primary Examiner* — Hanh V Tran
(74) *Attorney, Agent, or Firm* — Price Heneveld LLP (57) ABSTRACT

A structural cabinet for an appliance includes an outer wrapper and an inner liner defining an insulating cavity therebetween. A first insulating structural layer is disposed against an inner surface of the outer wrapper. A second insulating structural layer is disposed against the inward surface of the inner liner. A core insulating material is disposed between the first and second structural insulating layers, wherein the first and second insulating structural layers reinforce the outer wrapper and inner liner, respectively, and resist deflection when the core insulating material is in a compressed state within the insulating cavity.

19 Claims, 10 Drawing Sheets

(56) References Cited

U.S. PATENT DOCUMENTS

| | | | |
|---|---|---|---|
| 5,418,055 A * | 5/1995 | Chen | B29C 44/065 |
| | | | 428/317.7 |
| 5,500,305 A | 3/1996 | Bridges et al. | |
| 5,730,516 A * | 3/1998 | Vismara | B32B 5/20 |
| | | | 312/406 |
| 6,244,458 B1 | 6/2001 | Frysinger et al. | |
| 6,858,280 B2 | 2/2005 | Allen et al. | |
| 6,860,082 B1 | 3/2005 | Yamamoto et al. | |
| 7,316,125 B2 | 1/2008 | Uekado et al. | |
| 7,794,805 B2 | 9/2010 | Aumaugher et al. | |
| 7,815,269 B2 * | 10/2010 | Wenning | F25D 23/064 |
| | | | 312/401 |
| 8,881,398 B2 | 11/2014 | Hanley et al. | |
| 9,791,205 B2 * | 10/2017 | Mukherjee | F25D 23/066 |
| 10,041,724 B2 * | 8/2018 | Allo | B29C 65/48 |
| 10,222,116 B2 * | 3/2019 | Allo | F25D 23/062 |
| 10,371,430 B2 * | 8/2019 | Kim | F25D 23/00 |
| 2005/0042247 A1 | 2/2005 | Gomoll et al. | |
| 2008/0280090 A1 * | 11/2008 | Kim | B32B 3/04 |
| | | | 428/69 |
| 2009/0032541 A1 | 2/2009 | Rogala et al. | |
| 2009/0179541 A1 | 7/2009 | Smith et al. | |
| 2016/0230383 A1 * | 8/2016 | Knies | F16L 59/028 |
| 2017/0160001 A1 * | 6/2017 | Deka | F25D 23/062 |

* cited by examiner

STRUCTURAL INSULATING COMPONENT FOR A MULTI-LAYER INSULATION SYSTEM OF A VACUUM INSULATED STRUCTURE

FIELD OF THE DEVICE

The device is in the field of insulating structures for appliances, and more specifically, an insulating structural component for a vacuum insulated structure that reinforces the outer walls of a cabinet against deflection.

SUMMARY

In at least one aspect, a structural cabinet for an appliance includes an outer wrapper and an inner liner defining an insulating cavity therebetween. A first insulating structural layer is disposed against an inner surface of the outer wrapper. A second insulating structural layer is disposed against the inward surface of the inner liner. A core insulating material is disposed between the first and second structural insulating layers. The first and second insulating structural layers reinforce the outer wrapper and inner liner, respectively, and resist deflection when the core insulating material is in a compressed state within the insulating cavity.

In at least another aspect, an appliance includes a structural cabinet having an inside surface that defines an insulating cavity within the structural cabinet, wherein the insulating cavity defines an at least partial vacuum. An insulating structural layer is disposed against the inside surface, wherein the insulating structural layer is defined by a plurality of hollow glass spheres. The insulating structural layer defines an interstitial insulating space within the insulating cavity. A core insulating material is disposed within the interstitial insulating space. The insulating structural layer reinforces the structural cabinet and resists deflection when the core insulating material is exposed to the at least partial vacuum to define a compressed state within the insulating cavity.

In at least another aspect, a method for forming a structural cabinet for an appliance includes adhering first and second layers of glass spheres onto an inner surface of an outer wrapper and an inward surface of an inner liner, respectively, coupling the inner liner and the outer wrapper together to define an insulating cavity therein and also defining an interstitial insulating space between the first and second layers of glass spheres, disposing a core insulating material within the interstitial insulating space and sealing the inner liner and the outer wrapper to define an insulating structure.

In at least another aspect, a method for forming a structural cabinet for an appliance includes disposing an adhesive onto an inner surface of an outer wrapper and an inward surface of an inner liner, disposing a plurality of glass spheres onto the adhesive to define first and second layers of glass spheres, respectively, coupling the inner liner and the outer wrapper together to define an insulating cavity therein and also defining an interstitial insulating space between the first and second layers of glass spheres, disposing a core insulating material within the interstitial insulating space, expressing gas from the insulating cavity to define an at least partial vacuum therein, and sealing the inner liner and the outer wrapper to define a vacuum insulated structure.

These and other features, advantages, and objects of the present device will be further understood and appreciated by those skilled in the art upon studying the following specification, claims, and appended drawings.

DETAILED DESCRIPTION OF EMBODIMENTS

Figure 1:
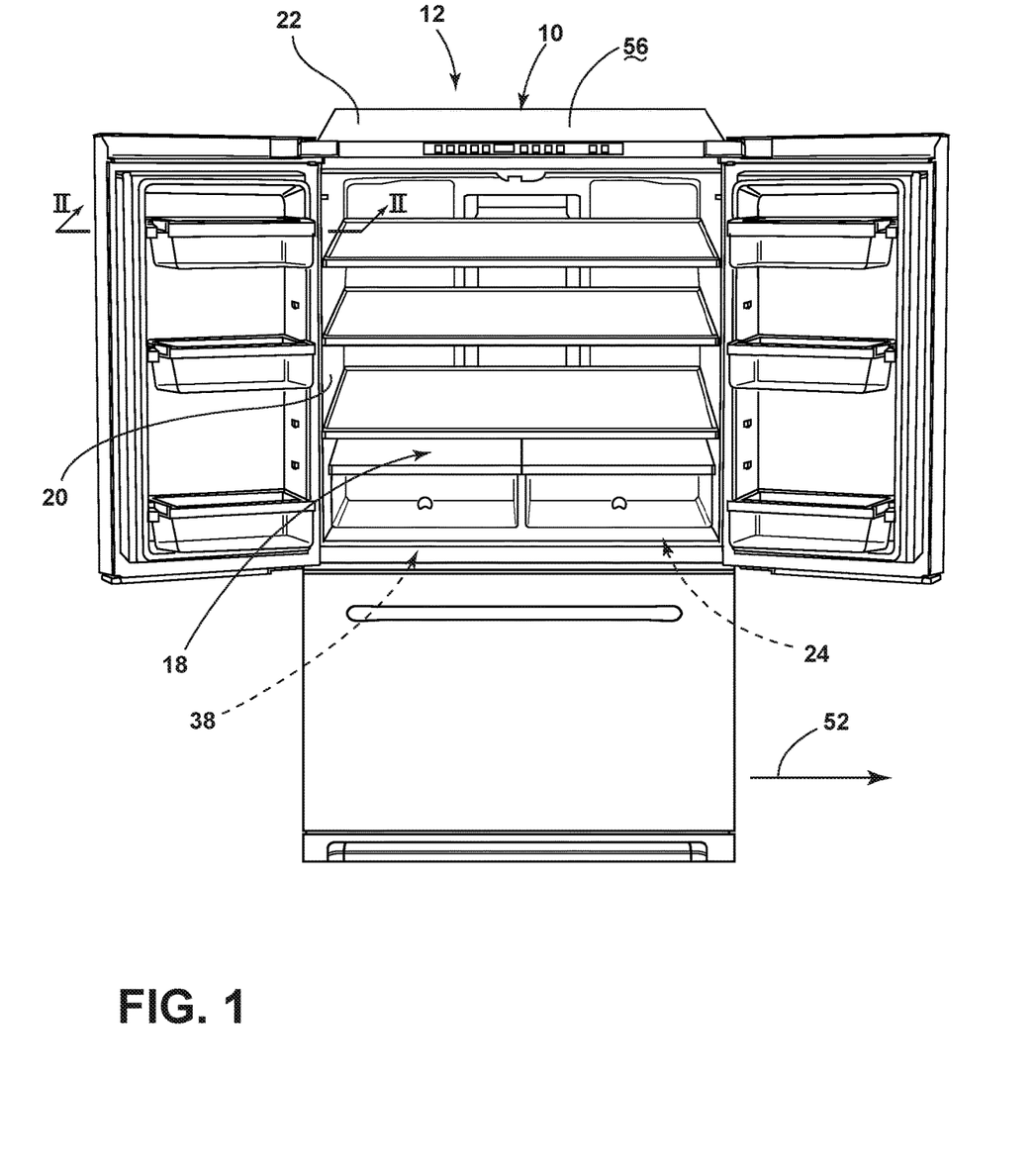
FIG. 1 is a front perspective view of an appliance incorporating an aspect of the multi-layer insulation system.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
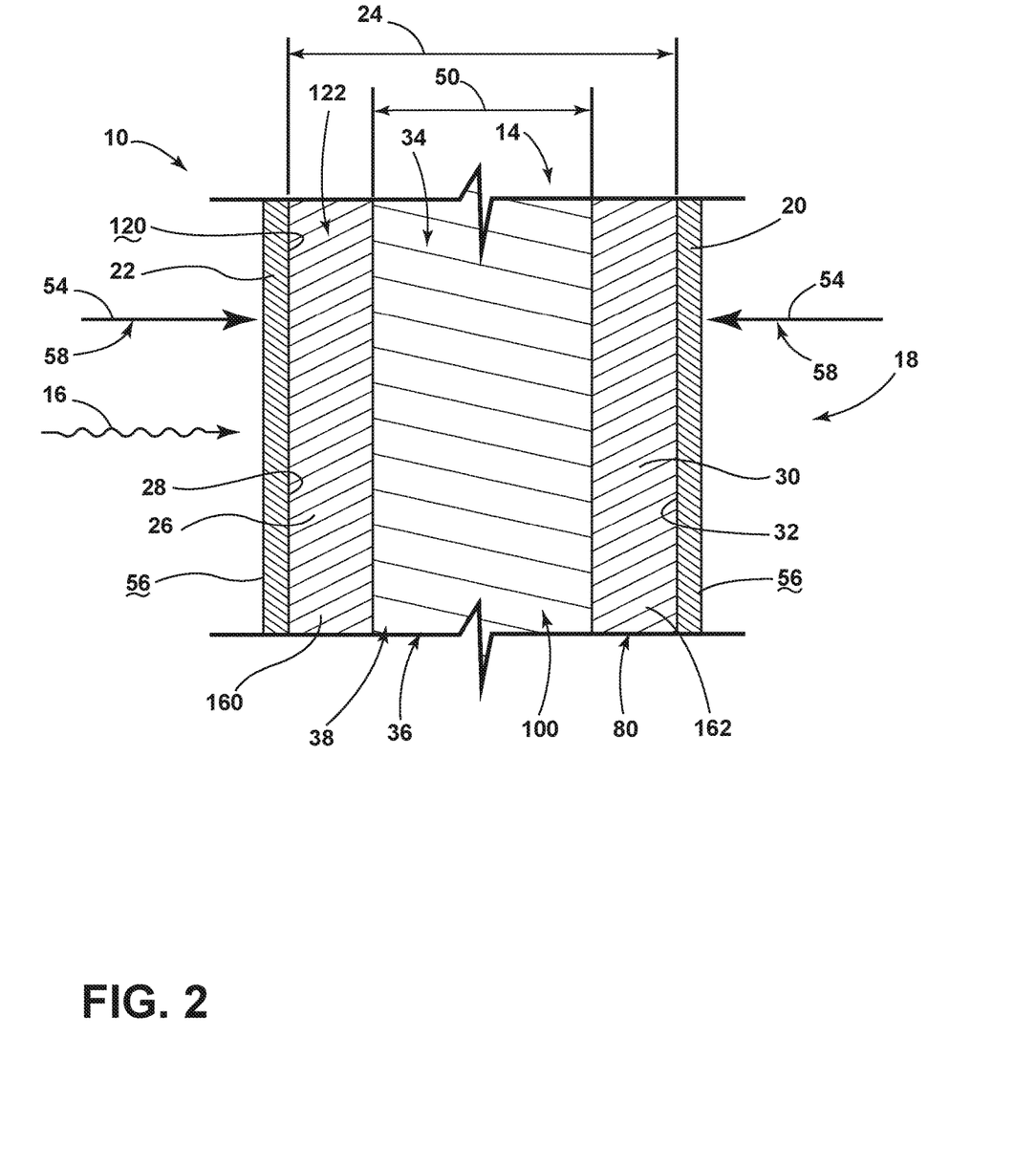
FIG. 2 is a schematic partial cross-sectional view of the appliance of FIG. 1 taken along line II-II.
Figure 3:
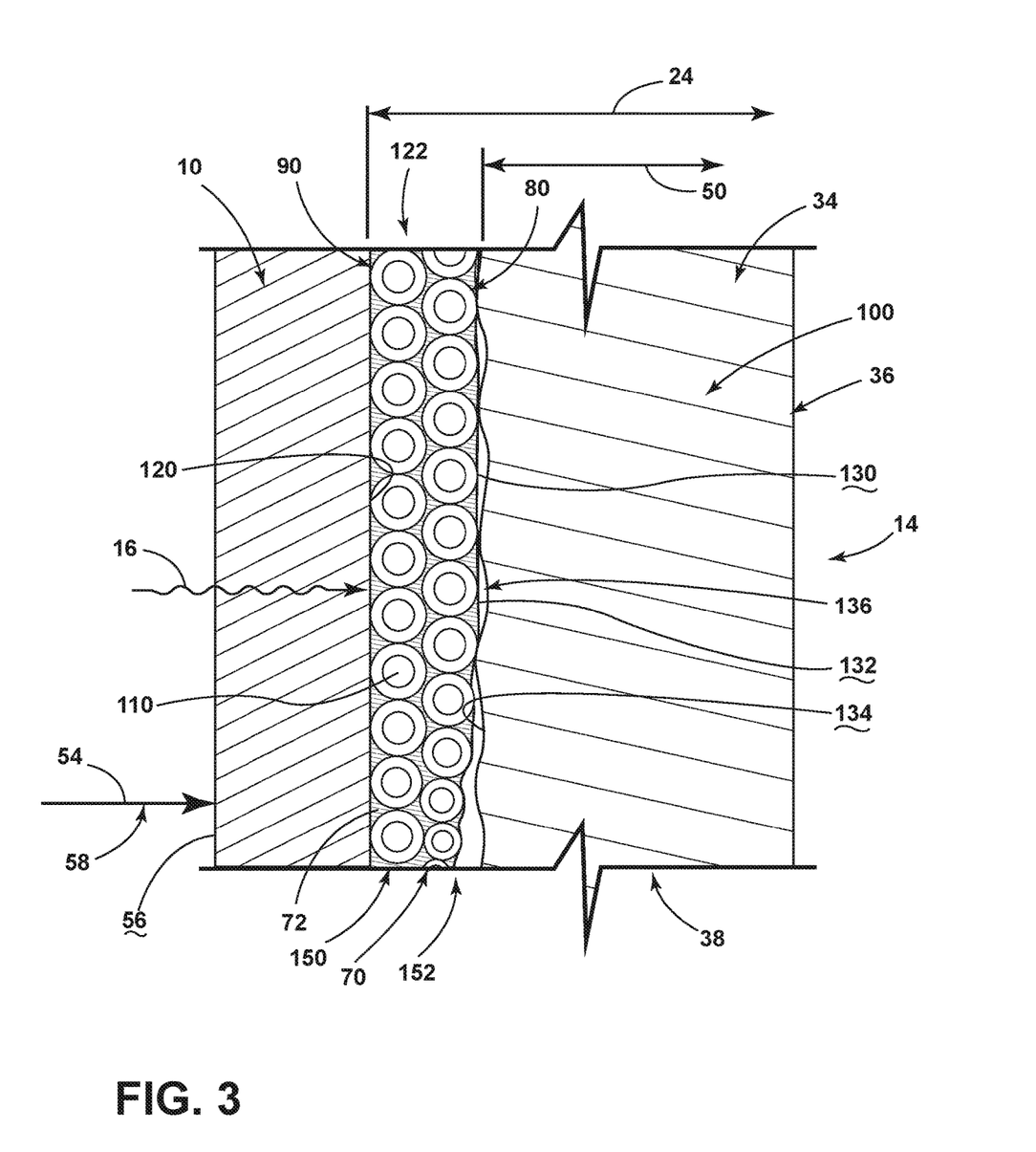
FIG. 3 is an enlarged schematic cross-sectional view of an aspect of the multi-layer insulation system for a vacuum insulated structure.
Figure 4:
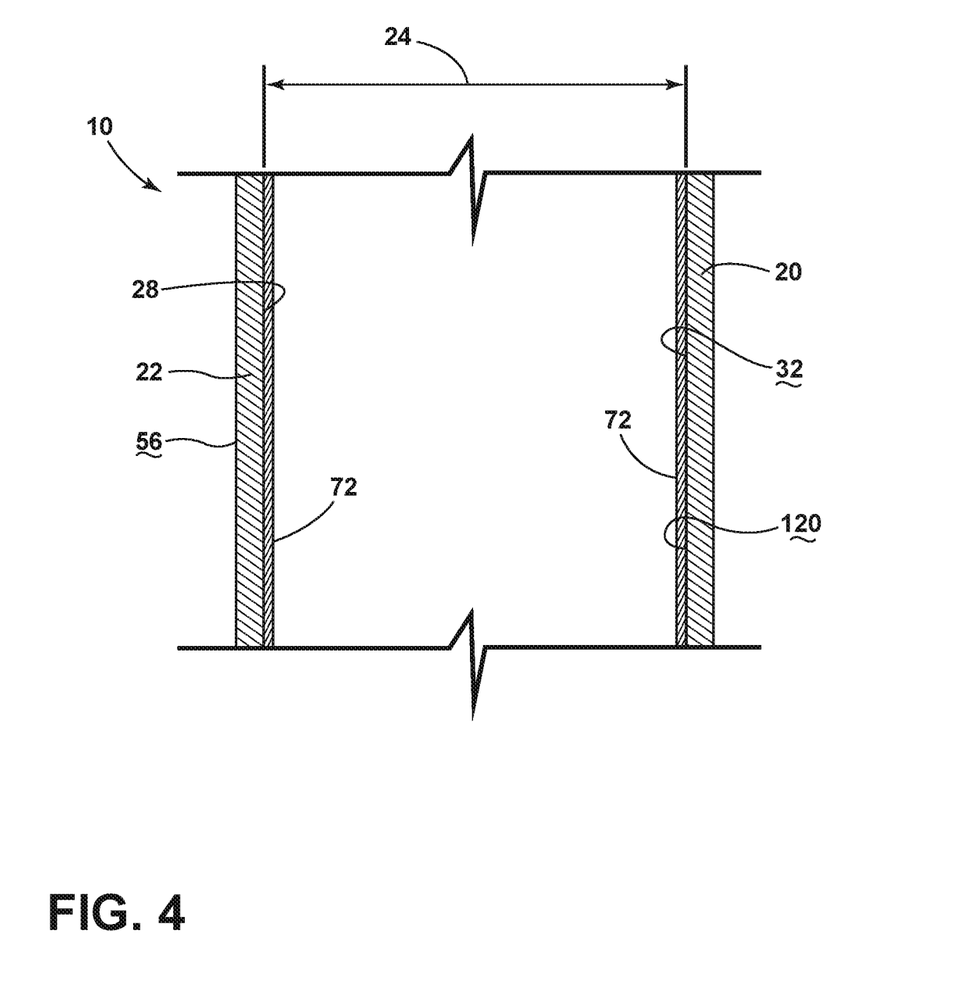
FIG. 4 is a schematic cross-sectional view of an aspect of a vacuum insulated structure showing application of an adhesive within an insulating cavity.
Figure 5:
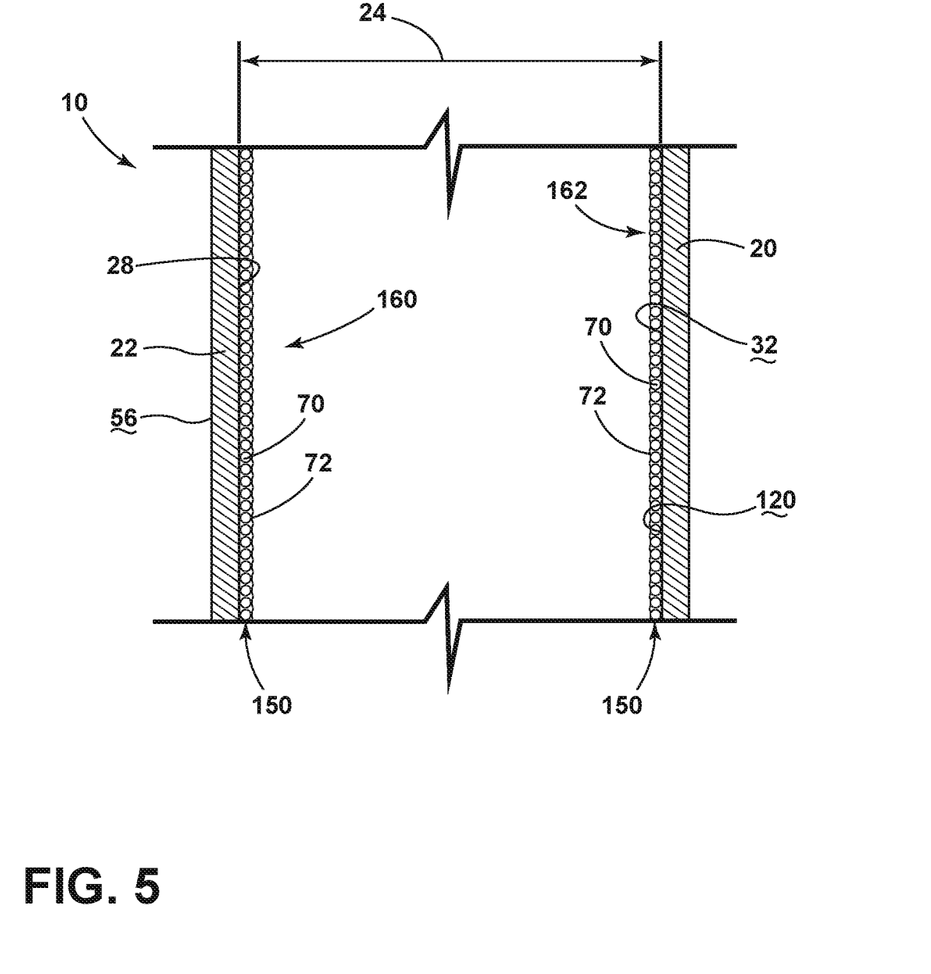
FIG. 5 is a cross-sectional view of the cabinet of FIG. 4 showing application of an outer layer of glass spheres.

As illustrated in FIGS. 1-3, reference numeral 10 generally refers to a structural cabinet for an appliance 12, where a multi-layer insulation system 14 is disposed within the structural cabinet 10 for limiting thermal transmission of heat 16 from an area outside of the structural cabinet 10 to a refrigerated compartment 18 defined within an inner liner 20 of the structural cabinet 10. According to the various aspects of the device, the structural cabinet 10 can include an outer wrapper 22 and an inner liner 20 that define an insulating cavity 24 therebetween. A first insulating structural layer 26 is disposed against an inner surface 28 of the outer wrapper 22. A second insulating structural layer 30 is disposed against the inward surface 32 of the inner liner 20. A core insulating material 34 is disposed between the first and second insulating structural layers 26, 30. The first and second insulating structural layers 26, 30 serve to reinforce the outer wrapper 22 and inner liner 20, respectively. In this manner, the first and second insulating structural layers 26, 30 serve to resist deflection when the core insulating material 34 is in a compressed state 36 within the insulating cavity 24. The compressed state 36 of the core insulating material 34 is typically defined by an at least partial vacuum 38 that is defined within the insulating cavity 24.

Referring again to FIGS. 1-3, in defining the at least partial vacuum 38 within the insulating cavity 24, the inner liner 20 and outer wrapper 22 are sealed together, such that the first and second insulating structural layers 26, 30 and the core insulating material 34 are contained therein. The insulating cavity 24 is defined between the inner liner 20 and the outer wrapper 22. Additionally, an interstitial insulating space 50 is defined between the first and second insulating structural layers 26, 30. It is contemplated that the first and second insulating structural layers 26, 30 can be applied either before or after the inner liner 20 and the outer wrapper 22 are connected together. In this manner, the first insulating structural layer 26 can be applied to the inner surface 28 of the outer wrapper 22 and the second insulating structural layer 30 can be separately applied to the inward surface 32 of the inner liner 20. Alternatively, the inner liner 20 and outer wrapper 22 can be connected together to define the insulating cavity 24. The first and second insulating structural layers 26, 30 can then be applied within the insulating cavity 24 and against the inward and inner surfaces 32, 28, respectively.

The core insulating material 34 is defined within this interstitial insulating space 50. As gas 52 is expressed from the insulating cavity 24, an inward compressive force 54 is exerted against the outer surface 56 of the inner liner 20 and outer wrapper 22 in a generally inward direction 58. This inward compressive force 54 acts to at least partially bias the outer wrapper 22 and inner liner 20 in an inward direction 58 and toward the core insulating material 34. The first and second insulating structural layers 26, 30 serve to reinforce and structurally support the outer wrapper 22 and the inner liner 20, respectively. Accordingly, the first and second insulating structural layers 26, 30 help the outer wrapper 22 and inner liner 20 to resist this biasing force and limit the amount of deflection resulting from the inward compressive force 54. In this manner, the outer wrapper 22 and inner liner 20 maintain a substantially consistent shape before, during and after the expression of gas 52 that defines the at least partial vacuum 38 within the insulating cavity 24.

In conventional cabinets, when a vacuum 38 is generated within an insulating cavity 24, the inward compressive force 54 generated thereby tends to cause an inward deflection of the walls of the conventional cabinet. Through this deflection, the outer surface 56 of the conventional cabinet, as it deflects inward, may conform to and tend to take the shape of the insulating material defined therein. The resulting formation of the cabinet can include a surface aesthetic that may not be desirable.

According to the various aspects of the device as exemplified in FIGS. 1-3, the first and second insulating structural layers 26, 30 resist this deflection from the inward compressive force 54 such that the aesthetic of the outer surface 56 of the structural cabinet 10 can be maintained during and after manufacture of the appliance 12. A Referring now to FIGS. 1-7, the first and second insulating structural layers 26, 30 can be made up of glass spheres 70 that are disposed on the inner surface 28 of the outer wrapper 22 and the inward surface 32 of the inner liner 20. These glass spheres 70 can be disposed against the outer wrapper 22 and the inner liner 20 through an adhesive 72, such that the first and second insulating structural layers 26, 30 are adhered to the outer wrapper 22 and inner liner 20, respectively. Additionally, the glass spheres 70 can be adhered to the inner and inward surfaces 28, 32 using a static charge, surface adhesion or other similar static adhering mechanism that is free of the use of adhesives. It should be understood that the terms "adhere" and "adhered" are not limited to the use of physical adhesives such as glue, epoxy, resin, silicone, combinations thereof or other similar physically applied adhesives. The terms adhere and adhered may also refer to adhesion by static electricity, surface adhesion, static charges, charged particles and other similar adhering methods that are free of the use of physical adhesives.

Referring now to FIGS. 4-7, during formation of the structural cabinet 10, the adhesive 72 for attaching the glass spheres 70 to the outer wrapper 22 and inner liner 20 can be applied to the inside surface 120 of the structural cabinet 10 and against each of the inner surface 28 of the outer wrapper 22 and the inward surface 32 of the inner liner 20. After the adhesive 72 is placed, the glass spheres 70 which can be a freely-flowable material can be blown, poured, or otherwise disposed against the inner surface 28 of the outer wrapper 22 and the inward surface 32 of the inner liner 20 to engage the adhesive 72. In this manner, the glass spheres 70 stick to the adhesive 72, thereby forming at least one layer of glass spheres 70 against the inside surface 120 of the structural cabinet 10. This process of applying the adhesive 72 and then disposing the glass spheres 70 against the adhesive 72 can be repeated to add additional layers of glass spheres 70 to define the first and second insulating structural layers 26, 30. The adhesive 72 can then be cured such that the glass spheres 70, in cooperation with the cured adhesive 72, form a reinforcing structure 80 that serves to buttress the outer wrapper 22 and inner liner 20 to resist deflection from the inward compressive force 54 resulting from the expression of gas 52 from the insulating cavity 24.

Referring again to FIGS. 3-7, the adhesive 72 may typically be disposed between the first insulating structural layer 26 and the inner surface 28 of the outer wrapper 22 in between the second insulating structural layer 30 and the inward surface 32 of the inner liner 20. The adhesive 72 can also be intermingled within and between the various glass spheres 70 that form the first and second insulating structural layers 26, 30.

In an alternative method for disposing the glass spheres 70 within the insulating cavity 24, the glass spheres 70 may first be mixed with an adhesive 72 such that each of the glass spheres 70 are coated by an adhesive 72 to define coated glass spheres 90. These coated glass spheres 90 having the coating of adhesive 72 can then be disposed within the insulating cavity 24 to define the first and second insulating structural layers 26, 30. As discussed previously, the insulating cavity 24 defined between the inner liner 20 and the outer wrapper 22 and the interstitial insulating space 50 is defined within the insulating cavity 24 and between the first and second insulating structural layers 26, 30.

Referring again to FIGS. 4-7, once the first and second insulating structural layers 26, 30 are formed, the core insulating material 34 can be disposed within the interstitial insulating space 50. Because of the placement of the first and second insulating structural layers 26, 30, it is contemplated that the core insulating material 34 is typically free of direct contact, or similar engagement, with the outer wrapper 22 and inner liner 20. In this manner, as gas 52 is expressed from the insulating cavity 24, the core insulating material 34 engages the first and second insulating structural layers 26, 30, rather than the inner surface 28 of the outer wrapper 22 and inward surface 32 of the inner liner 20.

According to various aspects of the device, the core insulating material 34 disposed within the interstitial insulating space 50 can be a free-flowing material that can be poured, blown, compacted or otherwise disposed within the interstitial insulating space 50. This free-flowing material can be in the form of various silica-based materials, such as fumed silica, precipitated silica, nano-sized and/or micro-sized aerogel powder, rice husk ash powder, perlite, cenospheres, diatomaceous earth, combinations thereof, and other similar insulating particulate material. The core insulating material 34 can also take the form of a formed insulating panel 100 that is disposed within the interstitial insulating space 50. Where an insulating panel 100 is used, this panel can take the form of a vacuum insulated panel that is preformed and then disposed within the interstitial insulating space 50.

Referring again to FIGS. 1-7, while the term "glass" is used to refer to the glass spheres 70, the glass spheres 70 can be made of various organic and/or inorganic materials that include, but are not limited to, glass, ceramic, polymers, combinations thereof, and other similar organic and/or inorganic materials. The glass spheres 70 that make up the first and second insulating structural layers 26, 30 can be hollow glass spheres 70. These hollow glass spheres 70 can define an internal space 110 that defines an at least partial vacuum 38. This internal space 110 of the hollow glass spheres 70 can also be filled with an insulating gas 52. The insulating gas 52 can be at least one of air, argon, neon, carbon dioxide, xenon, krypton, combinations thereof, and other similar insulating gasses that typically have insulating properties. Additionally, the glass spheres 70 and hollow glass spheres 70 can take the form of microspheres, nanospheres, combinations thereof, and other similarly sized particles. In aspects of the device where the coated glass spheres 90 that are coated in the adhesive 72 are disposed within the insulating cavity 24, the glass spheres 70 may take the form of agglomerates of glass spheres 70 that define the first and second insulating structural layers 26, 30.

When the first and second insulating structural layers 26, 30 are formed, the glass spheres 70 defined therein buttress the outer wrapper 22 and inner liner 20 to prevent deflection thereof during and after the expression of gas 52 performed in forming the vacuum insulated structure. Typically, the outer wrapper 22 and inner liner 20 will each be made of metal. In addition to being metallic, it is contemplated that the inner liner 20 and/or the outer wrapper 22 can also be made of different materials, such as polymers, plastics, metal alloys, combinations thereof, and other similar materials.

Referring again to FIG. 3, the structural cabinet 10 having the inside surface 120 that defines the insulating cavity 24 can be lined with an insulating structural layer 122 that is disposed against the inside surface 120. As discussed previously, the insulating structural layer 122 can be defined by a plurality of hollow glass spheres 70 that define an interstitial insulating space 50 set within the insulating cavity 24. The core insulating material 34 is disposed within the interstitial insulating space 50 such that the insulating structural layer 122 reinforces the structural cavity and resists deflection when the core insulating material 34 is in a compressed state 36 within the insulating cavity 24. The insulating structural layer 122 reinforces the structural cabinet 10 such that the outer surface 56 of the structural cabinet 10 maintains a consistent shape in response to the inward compressive force 54 generated by the at least partial vacuum 38 of the insulating cavity 24. In this manner, the insulating structural layer 122 prevents the outer surface 56 of the structural cabinet 10 from conforming to the shape of the insulation profile 134 of the core insulating material 34 within the interstitial insulating space 50.

As exemplified in FIG. 3, the exposed surface 130 of the hollow glass spheres 70 that makes up and at least partially defines the insulating structural layer 122 may have a particular reinforcing profile 132. Similarly, the core insulating material 34 defined within the interstitial insulating space 50 may have a separate insulation profile 134 that faces the reinforcing profile 132. When gas 52 is expressed from the insulating cavity 24, the shape of the structural cabinet 10 tends to conform to and is biased toward the shape of the insulation profile 134 of the core insulating material 34 to eliminate voids 136 that may exist between the insulating structural layer 122 and the core insulating material 34. The presence of the hollow glass spheres 70 of the insulating structural layer 122 reinforce the structural cabinet 10 and resists this biasing force that might otherwise lead to an undesired level of deflection. Accordingly, voids 136 may exist between the reinforcing profile 132 of the insulating structural layer 122 and the insulation profile 134 of the core insulating material 34. Typically, these voids 136 between the insulating structural layer 122 and the core insulating material 34 will be minimized where a free-flowing core insulating material 34 is used. This is because the free-flowing core insulating material 34 will typically conform to the shape of the reinforcing profile 132. Alternatively, where a vacuum insulated panel or other formed insulating panel 100 is used as the core insulating material 34, the presence of these voids 136 may be unavoidable, such that the reinforcing properties of the insulating structural layer 122 prevent the inward deflection of the structural cabinet 10 as gas 52 is expressed from the insulating cavity 24 thereby resulting in the presence of voids 136 between the reinforcing and insulation profiles 132, 134.

Figure 6:
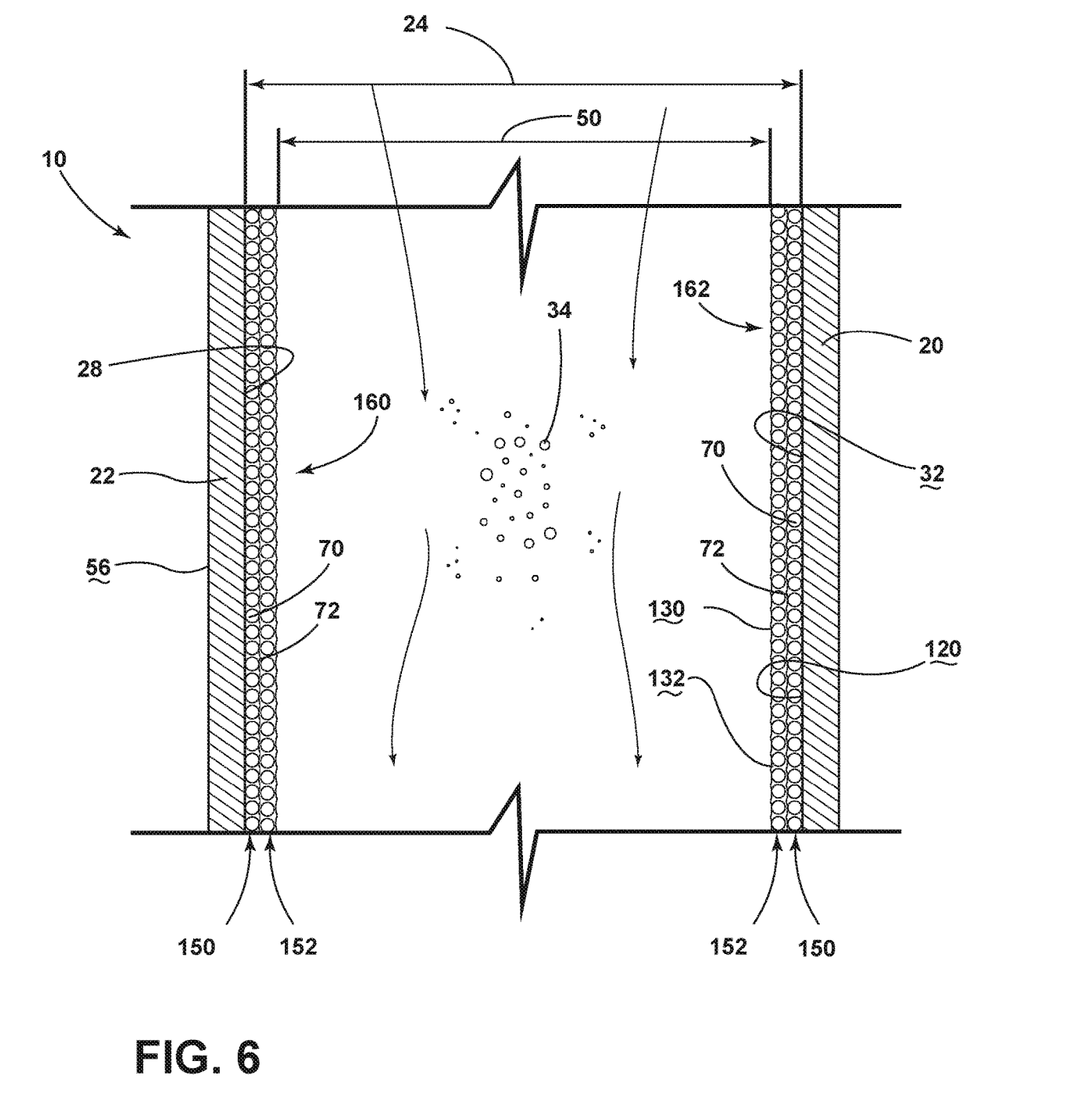
FIG. 6 is a cross-sectional view of the cabinet wall of FIG. 5 showing deposition of the insulating core material against an inner layer of glass spheres.
Figure 7:
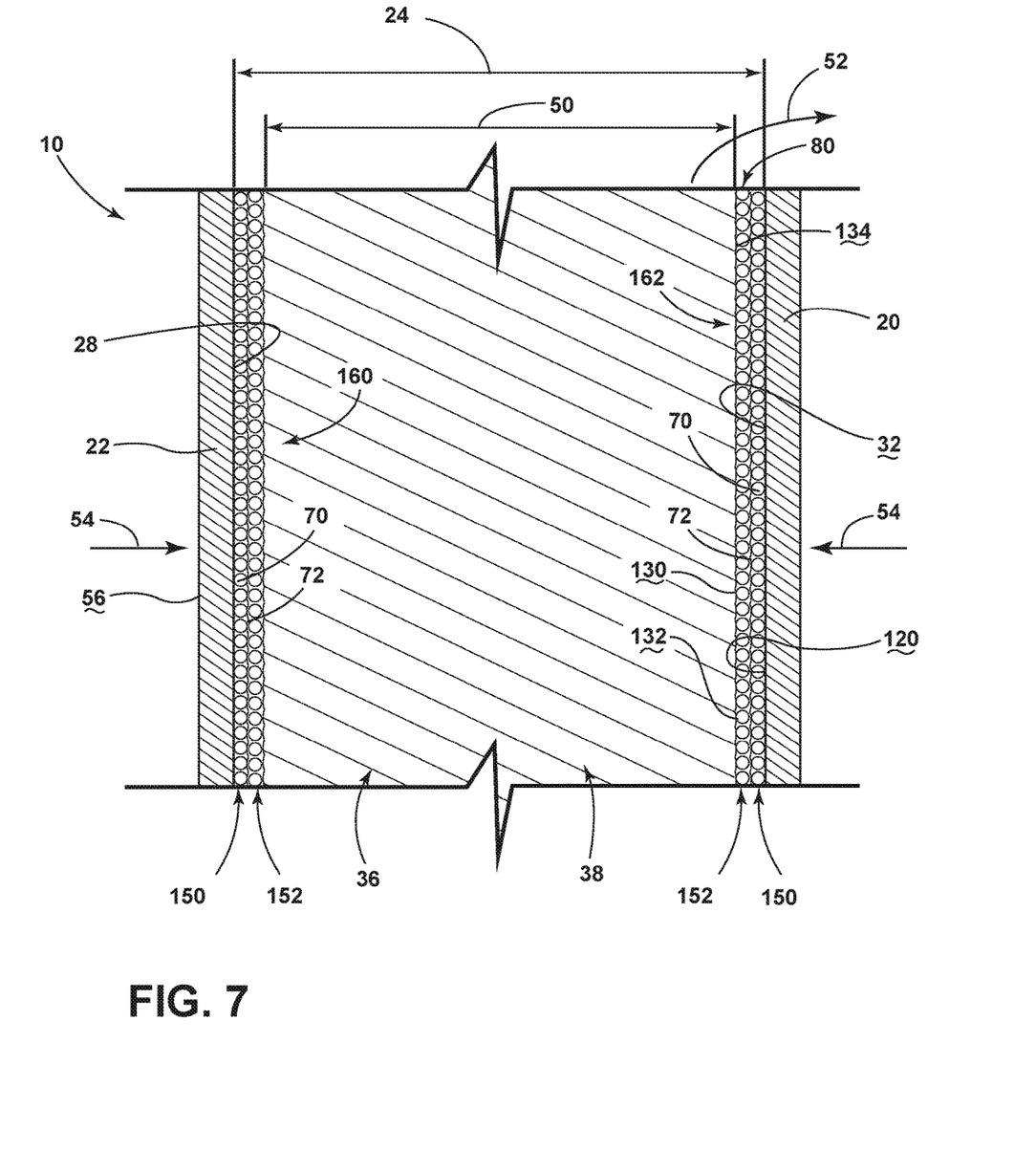
FIG. 7 is a cross-sectional view of the structural wall of FIG. 6 showing the finished vacuum insulated wall having a multi-layer insulation system.

Referring now to FIGS. 6 and 7, the insulating structural layer 122 made up of the hollow glass spheres 70 can include an outer layer 150 of hollow glass spheres 70 and an inner layer 152 of hollow glass spheres 70. In such an embodiment, the interstitial insulating space 50 is defined by the inner layer 152 of glass spheres 70 and the outer layer 150 of glass spheres 70 separates the inner layer 152 of glass spheres 70 from the inside surface 120 of the structural cabinet 10.

Figure 8:
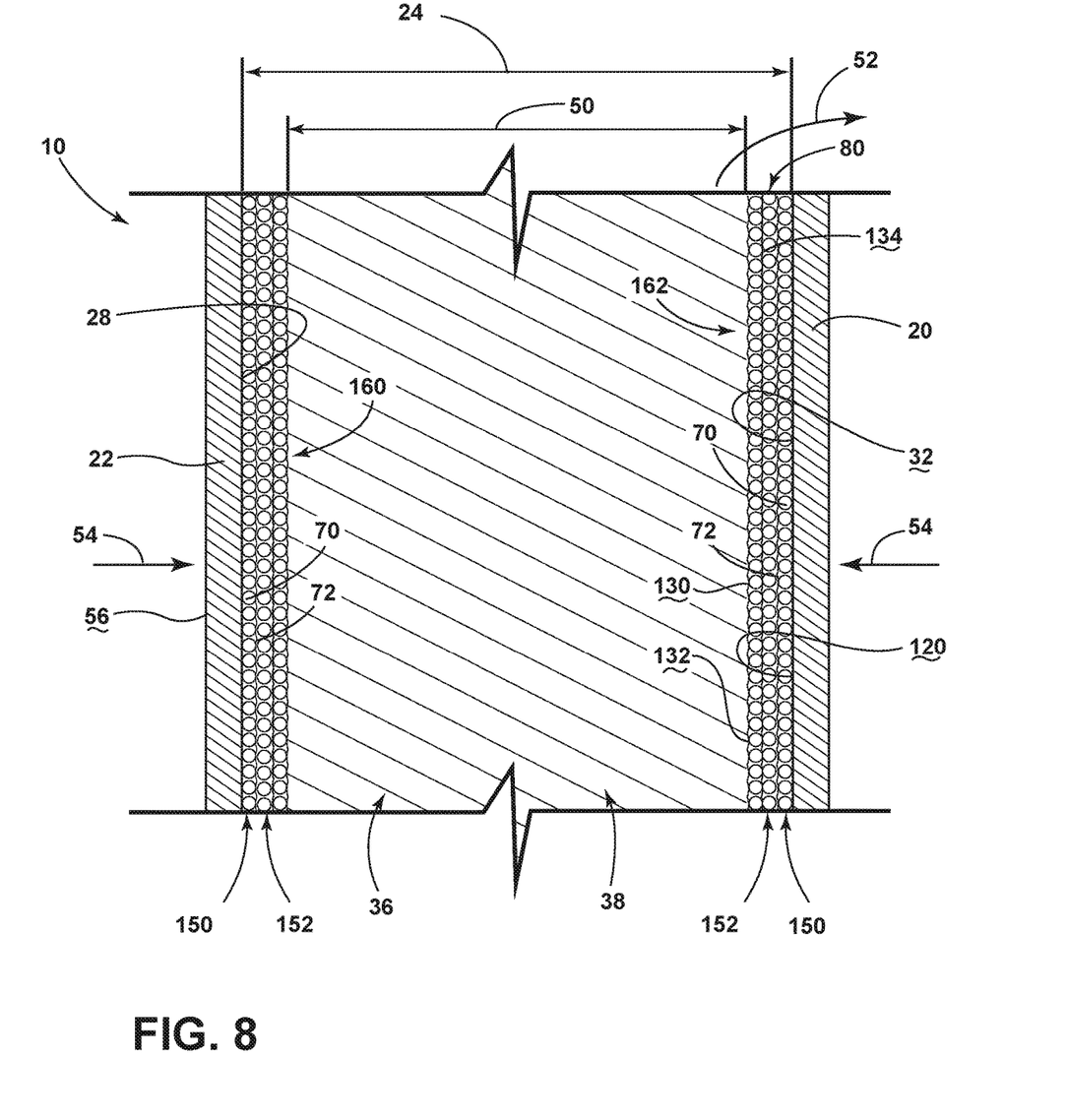
FIG. 8 is a cross-sectional view of an aspect of a structural cabinet having the multi-layer insulation system incorporated therein.
Figure 9:
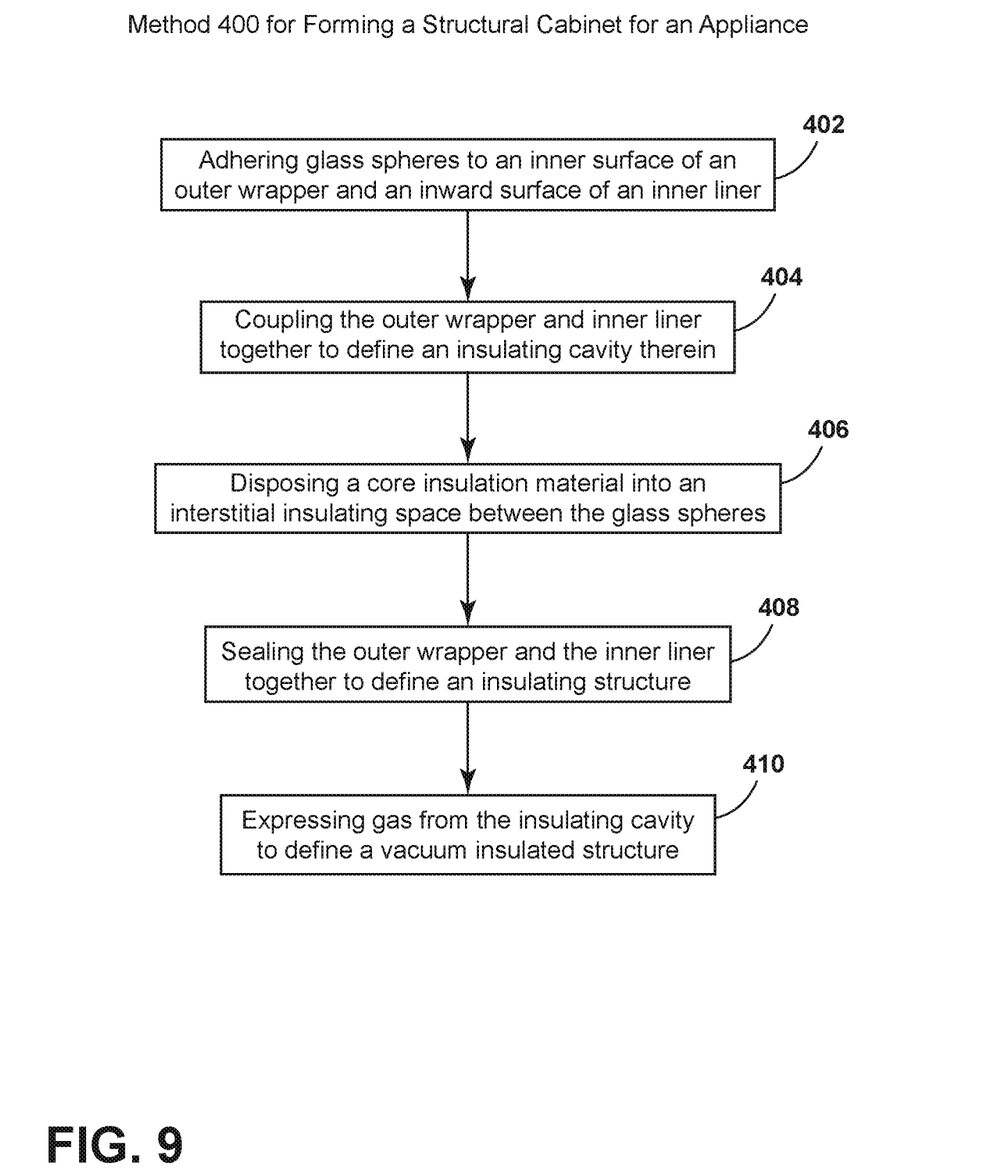
FIG. 9 is a schematic flow diagram illustrating a method for forming a structural cabinet for an appliance.
Figure 10:
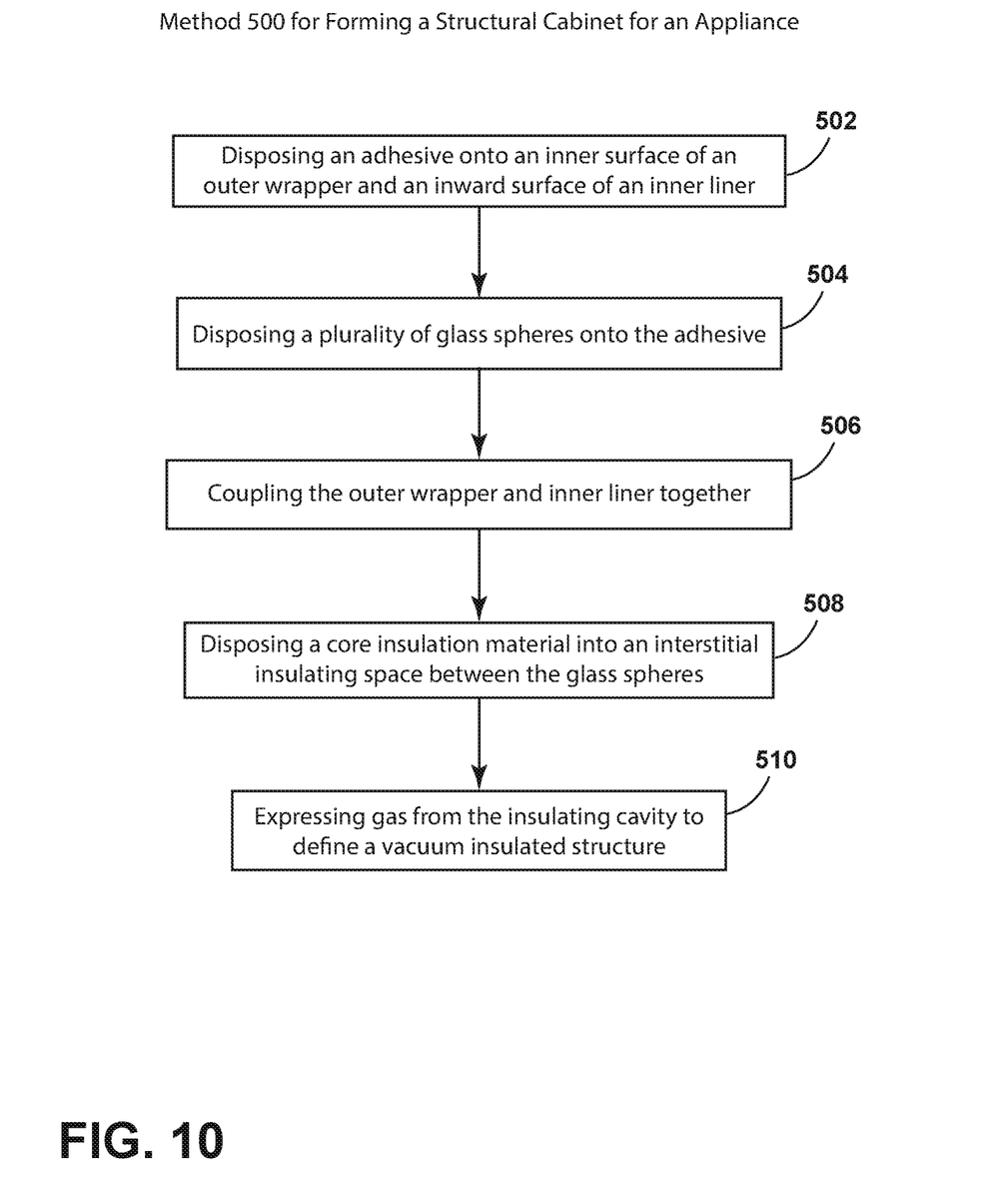
FIG. 10 is a schematic flow diagram illustrating a method for forming a structural cabinet for an appliance.

As exemplified in FIG. 8, it is contemplated that the insulating structural layer 122 can include more than two layers of glass spheres 70. Additional layers of glass spheres 70 may be necessary where additional reinforcing strength is necessary to buttress the outer wrapper 22 and inner liner 20 of the structural cabinet 10.

As exemplified in FIGS. 1-7, the use of the insulating structural layers 122 within the structural cabinet 10 serves to reinforce the structural cabinet 10 while also providing an insulating property through the use of the glass spheres 70 set within the adhesive 72. Accordingly, the thickness of the outer wrapper 22 and inner liner 20 can be relatively minimal or conventional. Structural rigidity can be added while also adding insulating properties to the structural cabinet 10 by integrating the glass spheres 70 as a structural portion of the structural cabinet 10. Through the use of the glass spheres 70, the structural cabinet 10 can be effectively thickened, while also increasing the resistance to thermal conduction of heat 16 through the structural cabinet 10.

According to various aspects of the device, the adhesive 72 can take the form of various adhesive 72. These adhesives 72 can include, but are not limited to, epoxy, silicone adhesives, resin-type materials, polymers, combinations thereof, and other similar structural adhesives 72 that can be used to bond the glass spheres 70 together and reinforce the outer wrapper 22 and inner liner 20 of the structural cabinet 10 against inward deflection as a result of the inward compressive forces 54 experienced as a result of the expression of gas 52 from the insulating cavity 24.

In forming the insulating structural layers 122, the layers of glass spheres 70 can define various thicknesses of the insulating structural layer 122. The thickness of the insulating structural layer 122 can vary depending upon the type of glass spheres 70 used in forming the insulating structural layer 122. The insulating structural layer 122 will typically have a thickness of up to approximately 500 microns. In various embodiments, the thickness of the insulating structural layer 122 may be within a range of from approximately 100 microns to approximately 180 microns. Additionally, where the glass spheres 70 are in the form of nanospheres, the insulating structural layer 122 may have a thickness of approximately 10 nanometers or less. While these ranges are provided, it should be understood that the thickness of the insulating structural layer 122 may also be within ranges greater than or less than those indicated herein. As discussed above, the thickness of the insulating structural layer 122 can depend upon the amount of reinforcement necessary at the outer wrapper 22 and inner liner 20 of the structural cabinet 10. The thickness of the insulating structural layer 122 can also vary depending on the thickness, diameter and/or size of the glass spheres 70 used.

Referring to FIGS. 1-9, having discussed various aspects of the multi-layer insulation system 14 having the insulating structural layer 122, a method 400 is disclosed for forming a structural cabinet 10 for an appliance 12. According to the method 400, first and second layers 160, 162 of glass spheres 70 are adhered onto an inner surface 28 of an outer wrapper 22 and inward surface 32 of an inner liner 20, respectively (step 402). As discussed above, this process of adhering can include disposing adhesive 72 onto the inner and inward surfaces 28, 32 of the structural cabinet 10 and then disposing a plurality of glass spheres 70 onto the adhesive 72 to define the first and second layers 160, 162. The plurality of glass spheres 70 can then be poured, blown, or otherwise disposed as a free-flowing powder, onto the adhesive 72, to form the first and second layers 160, 162 of glass spheres 70. This process can be repeated, wherein an additional layer of adhesive 72 can be applied and additional glass spheres 70 are applied over the adhesive 72 to define the outer and inner layers 150, 152, as well as additional layers of glass spheres 70 of the insulating structural adhesive 72. It is also contemplated that the plurality of glass spheres 70 can be adhered to the inner and inward surfaces 28, 32 using static charges. In such an embodiment, the glass spheres 70 are statically charged such that the charged glass spheres 70, using static electricity and/or surface adhesion, adhere to the inner and inward surfaces 28, 32 without the use of a physically applied adhesive. The outer wrapper 22 and inner liner 20 can then be coupled together to define the insulating cavity 24 therein (step 404). Through this process, the first and second layers 160, 162 of glass spheres 70 also define the interstitial insulating space 50 between the first and second layers 160, 162 of glass spheres 70. After the adhesive 72 is secured, such that the first and second layers 160, 162 of glass spheres 70 are fully adhered to the outer wrapper 22 and inner liner 20, respectively, the core insulating material 34 can be disposed within the interstitial insulating space 50 (step 406). The inner liner 20 and outer wrapper 22 can then be sealed to define an insulating structure (step 408). In conjunction with sealing the insulating structure, gas 52 can be expressed from the insulating cavity 24 to define a vacuum insulated structure (step 410).

Referring again to FIGS. 1-9, the process of adhering the first and second layers 160, 162 of glass spheres 70 can include disposing the adhesive 72 onto the plurality of glass spheres 70 to define coated glass spheres 90. These coated glass spheres 90 can then be disposed onto the inner and inward surfaces 28, 32 of the structural cabinet 10. The coated glass spheres 90 can then be manipulated into the outer and inner layers 150, 152 of glass spheres 70 over the inner and inward surfaces 28, 32 of the structural cabinet 10 to define the first and second layers 160, 162. Typically, the adhesive 72 will be disposed on the inside surface 120 of the structural cabinet 10. The free-flowing glass spheres 70 can then be disposed over the adhesive 72 to form each of the outer and inner layers 150, 152 of glass spheres 70 that define the insulating structural layers 122 for reinforcing the structural cabinet 10.

Referring now to FIGS. 1-8 and 10, a method 500 is disclosed for forming a structural cabinet 10 for an appliance 12. According to method 500, an adhesive 72 is disposed onto an inner surface 28 of an outer wrapper 22 and inward surface 32 of the inner liner 20 (step 502). The plurality of glass spheres 70 are then disposed onto the adhesive 72 to define first and second layers 160, 162 of glass spheres 70 onto the inner and inward surfaces 28, 32, respectively (step 504). The inner liner 20 and outer wrapper 22 can be coupled together to define an insulating cavity 24 therein (step 506). In defining the insulating cavity 24, the first and second layers 160, 162 of glass spheres 70 also define the interstitial insulating space 50 therebetween. Once the first and second layers 160, 162 of glass spheres 70 are formed with the interstitial insulating space 50 therebetween, the core insulating material 34 can be disposed within the interstitial insulating space 50 (step 508). Gas 52 can be expressed from the insulating cavity 24 to define an at least partial vacuum 38 therein (step 510). The inner liner 20 and outer wrapper 22 can then be sealed to define the vacuum insulated structure.

According to various aspects of the device, gas 52 can be expressed via a gas port that is defined within one of or both of the outer wrapper 22 and inner liner 20 for the structural cabinet 10. The core insulating material 34 and the glass spheres 70 can be disposed within the insulating cavity 24 via an insulation port that is also defined within the structural cabinet 10. Each of the gas port and insulation port can be sealed before, during or after the expression of gas 52 to seal the insulating cavity 24 and define the insulating structure.

Referring again to FIGS. 1-10, each of the first and second layers 160, 162 of glass spheres 70 can be defined by an outer layer 150 of glass spheres 70 and an inner layer 152 of glass spheres 70. In such an embodiment, the interstitial insulating space 50 is defined by the inner layer 152 of glass spheres 70. The outer layer 150 of glass spheres 70 serves to separate the inner layer 152 of glass spheres 70 from the inside surface 120 of the structural cabinet 10 that defines the insulating cavity 24. Additionally, the step 504 of disposing the plurality of glass spheres 70 onto the adhesive 72 can include curing the adhesive 72 to define a substantially rigid layer of glass spheres 70 that reinforces each of the inner liner 20 and outer wrapper 22.

According to various aspects of the device, the insulating structural layer 122 that is typically made up of glass spheres 70 can be used in various appliances 12. These appliances 12 can include, but are not limited to, refrigerators, freezers, coolers, laundry appliances, dishwashers, ovens, hot water heaters, and other similar appliances and fixtures within household commercial settings.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only.

Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A structural cabinet for an appliance, the structural cabinet comprising:
    an outer wrapper and an inner liner defining an insulating cavity therebetween;
    a first insulating structural layer disposed against an inner surface of the outer wrapper;
    a second insulating structural layer disposed against the inner surface of the inner liner, wherein the first and second insulating structural layers are adhered to the outer wrapper and the inner liner, respectively; and
    a core insulating material disposed between the first and second insulating structural layers, wherein the first and second insulating structural layers reinforce the outer wrapper and inner liner, respectively, and resist deflection when the core insulating material is in a compressed state within the insulating cavity, wherein the first and second insulating structural layers include at least one layer of glass spheres that are adhered to the inner surface of the inner liner and the inner surface of the outer wrapper to form a flexible layer of rigid glass spheres, wherein the flexible layer of rigid glass spheres define an interstitial insulating space that surrounds the core insulating material.

2. The structural cabinet of claim 1, wherein the core insulating material is substantially free of engagement with the outer wrapper and the inner liner.

3. The structural cabinet of claim 1, wherein the core insulating material is a silica-based material.

4. The structural cabinet of claim 1, wherein the glass spheres are hollow, and wherein each of the glass spheres defines an internal space that defines an at least partial vacuum.

5. The structural cabinet of claim 4, wherein each of the glass spheres defines an internal space that is at least partially filled with an insulating gas.

6. The structural cabinet of claim 1, wherein the insulating cavity is defined between the inner liner and the outer wrapper, and wherein the interstitial insulating space is defined between the first and second insulating structural layers, wherein the core insulating material is defined within the interstitial insulating space.

7. The structural cabinet of claim 1, further comprising:
    an adhesive that is disposed between the first insulating structural layer and the inner surface of the outer wrapper and between the second insulating structural layer and the inner surface of the inner liner, and wherein engagement between the core insulating material and the first and second insulating structural layers is free of adhesive.

8. The structural cabinet of claim 1, wherein the core insulating material is a formed insulating panel.

9. The structural cabinet of claim 8, wherein the formed insulating panel is a vacuum insulated panel.

10. The structural cabinet of claim 1, wherein the insulating cavity defines an at least partial vacuum.

11. The structural cabinet of claim 1, wherein the outer wrapper and the inner liner are each metallic.

12. An appliance comprising:
    a structural cabinet having an inside surface that defines an insulating cavity within the structural cabinet, wherein the insulating cavity defines an at least partial vacuum;

an insulating structural layer disposed against the inside surface, wherein the insulating structural layer is defined by a plurality of hollow glass spheres that are adhered to the inside surface, wherein the insulating structural layer has a thickness of less than 0.2 millimeters and defines an interstitial insulating space within the insulating cavity, wherein the plurality of hollow glass spheres include at least one of microspheres and nanospheres that cooperatively form a flexible layer of rigid particles that aid in structural reinforcement of the structural cabinet; and a core insulating material disposed within the interstitial insulating space, wherein the insulating structural layer reinforces the structural cabinet and resists deflection when the core insulating material is in a compressed state within the insulating cavity, wherein the insulating structural layer reinforces the structural cabinet such that an outer surface of the structural cabinet maintains a consistent shape in response to an inward compressive force generated by the at least partial vacuum of the insulating cavity, and wherein the insulating structural layer prevents the outer surface of the structural cabinet from conforming to a shape of an insulation profile of the core insulating material within the interstitial insulating space.

13. The appliance of claim 12, wherein the insulating structural layer is defined by an outer layer of the plurality of hollow glass spheres and an inner layer of the plurality of hollow glass spheres.

14. The appliance of claim 13, wherein the interstitial insulating space is defined by the inner layer of glass spheres and wherein the outer layer of hollow glass spheres separates the inner layer of hollow glass spheres from the inside surface of the structural cabinet.

15. The appliance of claim 12, wherein the plurality of hollow glass spheres are adhered to the inside surface of the structural cabinet by at least one of a static charge and an adhesive.

16. The appliance of claim 12, wherein the core insulating material is substantially free of direct engagement with the inside surface of the structural cabinet.

17. A method for forming a structural cabinet for an appliance, the method comprising steps of:
    disposing an adhesive onto an inner surface of an outer wrapper and an inward surface of an inner liner;
    disposing a plurality of glass spheres onto the adhesive to define first and second layers of glass spheres, respectively;
    coupling the inner liner and the outer wrapper together to define an insulating cavity therein and also defining an interstitial insulating space between the first and second layers of glass spheres, the first and second layers of glass spheres forming a flexible layer of rigid particles that are positioned for structurally reinforcing the outer wrapper and the inner liner, respectively;
    disposing a core insulating material within the interstitial insulating space, wherein the core insulating material is engaged with the first and second layers of glass spheres free of adhesives, and wherein a plurality of voids exist between the core insulating material and the first and second layers of glass spheres;
    expressing gas from the insulating cavity to define an at least partial vacuum therein; and
    sealing the inner liner and the outer wrapper to define a vacuum insulated structure.

18. The method of claim 17, wherein each of the first and second layers of glass spheres are defined by an outer layer of glass spheres and an inner layer of glass spheres, wherein the interstitial insulating space is defined by the inner layers of glass spheres and wherein the outer layer of glass spheres separates the inner layer of glass spheres from an inside surface of the insulating cavity.

19. The method of claim 18, wherein the step of disposing the plurality of glass spheres onto the adhesive includes curing the adhesive to define the flexible layer of rigid particles that reinforces each of the outer wrapper and the inner liner.

* * * * *